United States Patent
Stonely et al.

(10) Patent No.: US 11,079,578 B1
(45) Date of Patent: Aug. 3, 2021

(54) HIGH PERFORMANCE TELESCOPE

(71) Applicant: RAYTHEON COMPANY, Waltham, MA (US)

(72) Inventors: Aaron Stonely, McKinney, TX (US); Stephen Felix Sagan, Lexington, MA (US); Brian M. Graue, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/727,091

(22) Filed: Dec. 26, 2019

(51) Int. Cl.
*G02B 17/06* (2006.01)
*G02B 17/08* (2006.01)
*G02B 23/06* (2006.01)

(52) U.S. Cl.
CPC ..... *G02B 17/0642* (2013.01); *G02B 17/0631* (2013.01); *G02B 17/0647* (2013.01); *G02B 17/082* (2013.01); *G02B 23/06* (2013.01)

(58) Field of Classification Search
CPC .......................... G02B 17/06; G02B 17/0642; G02B 17/0647; G02B 17/0631; G02B 23/00; G02B 23/06; G02B 23/02; G02B 13/14; G02B 13/146; G02B 5/08; G02B 5/10; G02B 17/08; G02B 17/082; G02B 17/0626; G01S 3/781; G01S 3/786
USPC ....... 359/366, 351, 355, 365, 399, 403, 422, 359/859, 857, 861
See application file for complete search history.

(56) References Cited

U.S. PATENT DOCUMENTS 3,950,079 A 4/1976 Rambauske
4,471,447 A * 9/1984 Williams ............. G01B 11/272 250/201.1
5,227,923 A * 7/1993 Kebo .................. G02B 17/0636 359/366
7,110,174 B2 9/2006 Dane et al.
7,248,405 B2 7/2007 Sidorin et al.
2004/0051878 A1 3/2004 Rhoads
2008/0186568 A1* 8/2008 Chen ..................... G01S 7/4812 359/366
2014/0240820 A1* 8/2014 Sitter, Jr. ................ G01S 3/781 359/351

FOREIGN PATENT DOCUMENTS

JP 3041283 B2 5/2000
WO 2017213722 A1 12/2017

OTHER PUBLICATIONS

International Search Report and Written Opinion in International Patent Application No. PCT/US2020/049710 dated Nov. 27, 2020.

* cited by examiner

*Primary Examiner* — Jie Lei
(74) *Attorney, Agent, or Firm* — Lando & Anastasi, LLP

(57) ABSTRACT

A telescope includes a primary mirror, a secondary mirror configured to move along a first axis, and a tertiary mirror configured to move along a second axis. The secondary and tertiary mirrors are configured to move along respective axes in a synchronized manner to focus a beam of electromagnetic radiation from the primary mirror. The telescope further may include an anamorphic deformable mirror configured to achieve wavefront control and correction of optical aberrations. The telescope further may include a first linear actuator configured to move the secondary mirror along the first axis and a second linear actuator configured to move the tertiary mirror along the second axis.

18 Claims, 6 Drawing Sheets

HIGH PERFORMANCE TELESCOPE

FEDERALLY SPONSORED RESEARCH

This invention was made with government support under Contract No. W9113M-17-D-0006-0002 awarded by the U.S. Department of Defense. The government has certain rights in the invention.

BACKGROUND OF THE INVENTION

Modern aircraft use a number of imaging aids to assist the crew in viewing a scene and selecting targets in the scene. Visible, infrared, and/or specific spectral band imaging devices are used in various applications to form an image of the scene. The type of imaging spectrum depends upon weather conditions, the nature of the scene, as well as other factors.

There are telescope designs that use a moving secondary mirror to focus high-energy laser at range. With such designs, a single mirror is moved in multiple axes to focus the beam. It is desirable that the telescope is capable of focusing the laser and maintaining wavefront error for good imaging performance across target ranges of interest.

SUMMARY OF INVENTION

One aspect of the disclosure is directed to a telescope comprising a primary mirror, a secondary mirror configured to move along a first linear axis, and a tertiary mirror configured to move along a second linear axis. The secondary and tertiary mirrors are configured to move along respective axes in a synchronized manner to focus electromagnetic radiation from the primary mirror.

Embodiments of the telescope further may include an anamorphic deformable mirror configured to achieve wavefront control and correction of optical aberrations. The telescope further may include a fast steering mirror configured to reflect electromagnetic radiation from the deformable mirror to an off-axis parabolic objective. The fast steering mirror may include a reflective surface that is configured to be manipulated to control the direction of the reflection of electromagnetic radiation produced by the laser to remove beam walk of the emitted laser beam as the secondary and tertiary mirrors are moved during focus and maintain boresight. The telescope further may include a high-energy laser/short-wave infrared (HEL/SWIR) combiner/beam splitter disposed between the fast steering mirror and the off-axis parabolic objective. The HEL/SWIR combiner/beam splitter may be configured to direct a portion of electromagnetic radiation the off-axis parabolic objective and short-wave infrared imager. In one embodiment, at least one fold mirror may be configured to direct the SWIR portion of electromagnetic radiation to a group of optical elements. The optical elements may include at least one of a focus element, a narrow/wide field of view group, a first wide field of view group and a second wide field of view group. The second wide field of view group may include a filter wheel. The telescope may be configured to reduce vignetting by manipulating the anamorphic deformable mirror. The telescope further may include a first actuator configured to move the secondary mirror along the first axis. The first actuator may be a linear actuator configured to move the secondary mirror a travel range of 13 mm. The first actuator may be configured to move the secondary mirror to achieve a sensor resolution of 0.005 µm and a minimum incremental motion of 0.1 µm. The telescope further may include a second actuator configured to move the tertiary mirror along the second axis. The second actuator may be a linear actuator configured to move the tertiary mirror a travel range of 50 mm. The second actuator may be configured to move the tertiary mirror to achieve a sensor resolution of 0.060 µm and a minimum incremental motion of 0.02 µm. The telescope may be configured to achieve a root mean square wavefront on-axis error below 0.15 waves @1.055 um over entire 0.3 km to infinity range. The telescope further may include a housing configured to support the primary mirror, the secondary mirror and the tertiary mirror.

Another aspect of the disclosure is directed to a method of directing electromagnetic radiation along an optical path of a telescope. In one embodiment, the method comprises: directing electromagnetic radiation to a primary mirror configured to receive and reflect electromagnetic radiation along the optical path; directing electromagnetic radiation from the primary mirror to a secondary mirror configured to receive electromagnetic radiation from the primary mirror and to reflect electromagnetic radiation along the optical path; and directing electromagnetic radiation from the secondary mirror to a tertiary mirror configured to receive electromagnetic radiation from the secondary mirror and to reflect electromagnetic radiation along the optical path. The secondary and tertiary mirrors are configured to move along respective axes in a synchronized manner to focus electromagnetic radiation from the primary mirror.

Embodiments of the method further may include directing electromagnetic radiation from the tertiary mirror to an anamorphic deformable mirror configured to achieve wavefront control and correction of optical aberrations. The method may include directing a portion of electromagnetic radiation from the deformable mirror to a short-wave infrared imager. Directing a portion of electromagnetic radiation may include directing the portion of electromagnetic radiation to a fast steering mirror configured to reflect electromagnetic radiation from the deformable mirror to an off-axis parabolic objective. The method further includes positioning a high-energy laser/short-wave infrared combiner/beam splitter between the fast steering mirror and the off-axis parabolic objective, the HEL/SWIR combiner/beam splitter being configured to direct a portion of the beam of electromagnetic radiation to the off-axis parabolic objective and then to a short-wave infrared imager using fold mirrors if needed for packaging.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Figure 1:
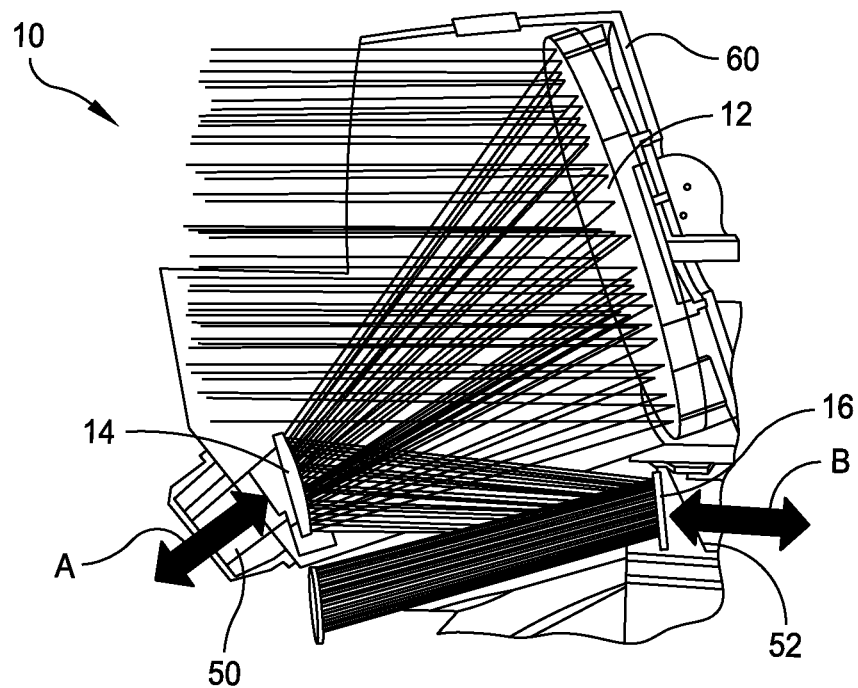
FIG. 1 is a schematic view of a telescope of an embodiment of the present disclosure.

High-energy laser applications are increasingly using common laser and imaging path optical designs to provide the pointing accuracy required to put the energy on the target of interest. Typical imaging systems use an afocal telescope with an intermediate image to provide high performance in a compact volume with standard optic sizing. For the very high-energy laser applications, e.g., 100 kW or greater, an intermediate image must be avoided due to risk of air breaking down risking damage to the hardware and adversely impacting beam quality. Mersenne-style telescope designs with a moving secondary mirror can be used to avoid the intermediate image and focus the laser at range; however, imaging performance is significantly degraded as the focus is adjusted away from the nominal design focus point. A design is required that can provide the imaging performance and laser focus across the required range of target distances.

Embodiments of the present disclosure include a mersenne-style telescope design with multiple moving mirrors that are used to focus the laser beam while avoiding the intermediate image. The secondary and tertiary mirrors are moved along the optical axis ray to focus the high-energy laser beam at the desired range. By moving the tertiary mirror in addition to the secondary mirror, the telescope is capable of achieving excellent on-axis wavefront error across the target ranges of interest, particularly at closer ranges. Wavefront error is defined as the difference between the reference wavefront phase, which is a constant phase or spherical phase, and the detected wavefront phase of one optical system. Moving the mirrors each along a single axis allows simple linear slides to be used to move the mirrors, avoiding the complexity and size required for multi-axis movement.

In some embodiments, the telescope is designed over range but for optimum performance at a specific target distance, e.g., 1 km.

In some embodiments, the telescope is configured to improve high-energy laser performance over various methods of focusing.

In some embodiments, the telescope includes an anamorphic deformable mirror configured to achieve wavefront control and correction of optical aberrations.

In some embodiments, boresight and beam walk on primary are managed by adjustments to a fast steering mirror.

In some embodiment, beam walk is controlled with +/−3 mrad of fast steering mirror compensation, with a footprint on the primary mirror increasing from a diameter of 38.56 cm at infinity to diameter of 39.92 at 0.3 km focus.

In some embodiments, the telescope is configured to limit root mean square wavefront on-axis error below 0.15 waves @1.055 um over entire 0.3 km to infinity range.

In some embodiments, the telescope is configured with a short-wave infrared imager that is optimized over entire band 0.9-1.7 μm.

In some embodiments, the telescope includes a catadioptric design with decentered parabolic mirror objective and refractive relay reduces field curvature for performance and lens diameters to less than 2.8 inch.

In some embodiments, the telescope is configured for dual zoom capabilities in wide field of view and narrow field of view, with narrow field of view being is static with a common focus element.

In some embodiments, the telescope includes a deformable mirror, which are mirrors whose surfaces can be deformed to achieve wavefront control and correction of optical aberrations. Deformable mirrors are used in combination with wavefront sensors and real-time control systems in adaptive optics. The shape of a deformable mirror can be controlled with a speed that is appropriate for compensation of dynamic aberrations present in the optical system. In practice, the deformable mirror shape can be changed much faster than the process to be corrected, as the correction process, even for a static aberration, may take several iterations. A deformable mirror usually has many degrees of freedom, which are associated with the mechanical actuators and can be roughly taken that one actuator corresponds to one degree of freedom. The deformable mirror can be configured to set the vignetting to the imager. Limited vignetting allows the deformable mirror to be set to reasonable size, e.g., 3-inch diameter. Location of vignetting affects slope of a vignetting curve and controls size of imager elements.

In some embodiments, the telescope includes a primary mirror sized to 47 cm for beam tolerancing.

In some embodiments, the secondary and tertiary mirrors of the telescope are each movable along a respective single axis to focus across an engagement range. Moving the tertiary mirror improves wavefront error across an engagement range. The secondary and tertiary mirrors each travel along a linear axis at a synchronized rate that can also include rotation of a fast steering mirror at a synchronized rate.

In some embodiments, the telescope includes actuators to provide a total travel and position accuracy required for focus, e.g., Physik Instrumente actuators.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to the drawings, and more particularly to FIG. 1, a high-performance telescope is generally indicated at 10. As shown, the telescope 10 includes a primary mirror 12 that is configured to receive and reflect a beam of electromagnetic radiation prior entering the telescope 10. The telescope 10 further includes a secondary mirror 14 that is configured to receive and reflect the beam of electromagnetic radiation from the primary mirror 12 and a tertiary mirror 16 that is configured to receive and reflect the beam of electromagnetic radiation from the secondary mirror 14. As will be described in greater detail below, the secondary and tertiary mirrors 14, 16 are configured to move along respective axes A, B in a synchronized manner to focus the beam of electromagnetic radiation.

Figure 2:
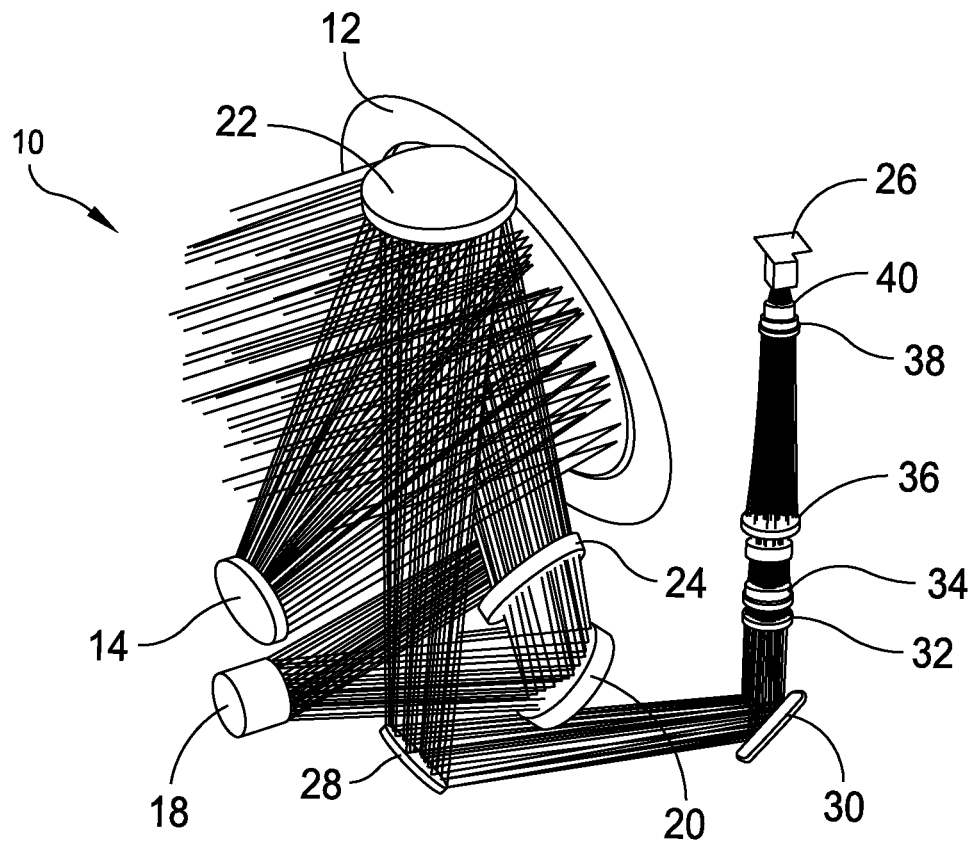
FIG. 2 is a schematic perspective view of the telescope showing a ray trace of a short-wave infrared wide field of view imaging path.
Figure 3:
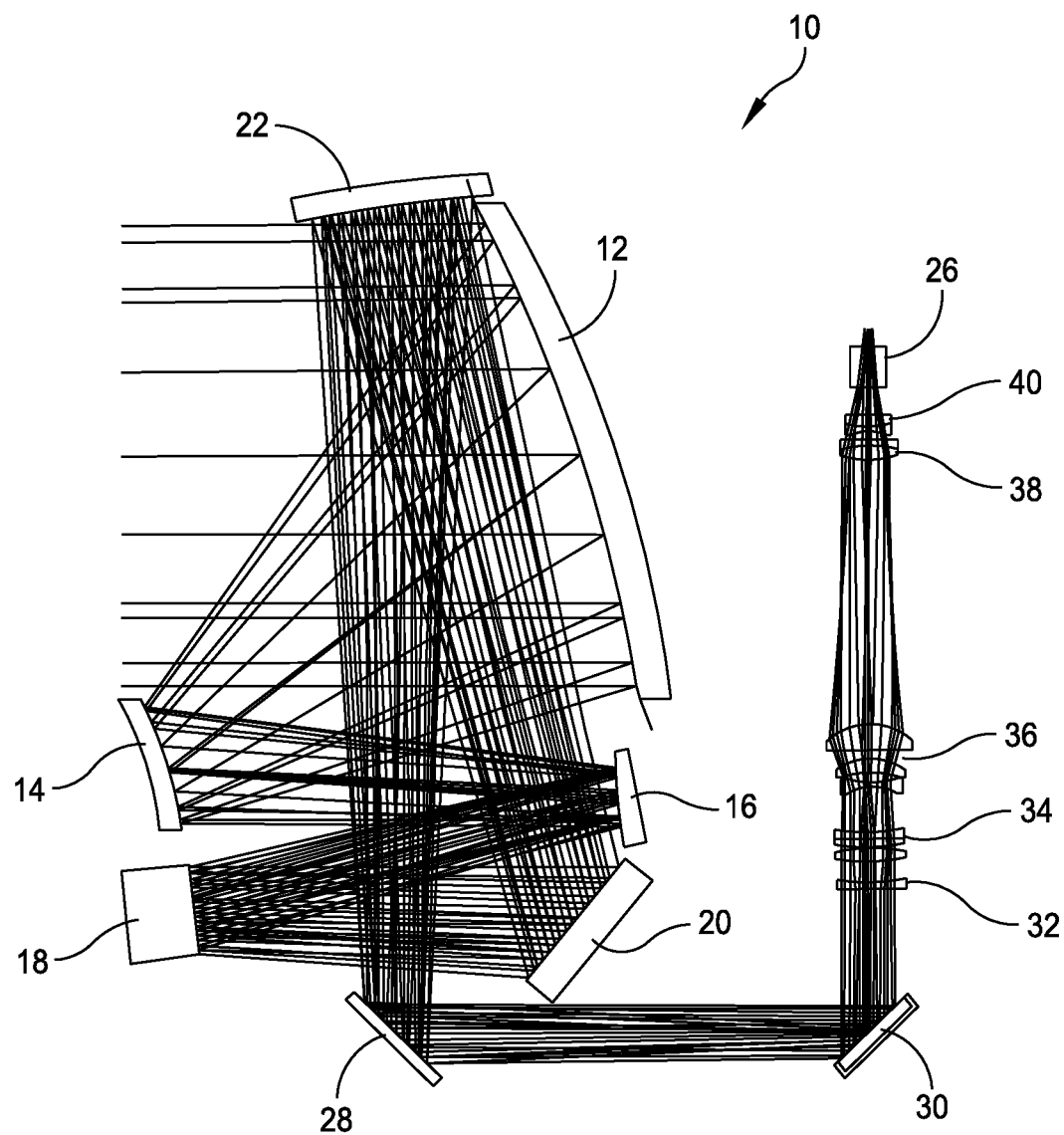
FIG. 3 is a schematic side view of the telescope showing the ray trace of the short-wave infrared wide field of view imaging path.

Referring to FIGS. 2 and 3, the telescope 10 further includes an anamorphic deformable mirror 18 configured to achieve wavefront control and correction of optical aberrations and a fast steering mirror 20 configured to reflect the beam of electromagnetic radiation from the deformable mirror 18 to an off-axis parabolic objective 22. Disposed between the fast steering mirror 20 and the off-axis parabolic objective 22 is a high-energy laser/short-wave infrared combiner/beam splitter 24 configured to direct a portion of the beam of electromagnetic radiation to a short-wave infrared (SWIR) imager 26. The remaining portion of the beam of electromagnetic radiation is directed from the off-axis parabolic objective 22 to fold mirrors 28, 30, which in turn direct the beam of electromagnetic radiation to a group of optical elements including a focus element 32, a narrow/wide field of view group of lenses 34, a first wide field of view group of lenses 36 and a second wide field of view group of lenses 38. In one embodiment, the second wide field of view group includes a filter wheel 40. The SWIR imager 26 is provided to receive the treated beam of electromagnetic radiation, and can be replaced with another type of imager, such as a visible imager.

In one embodiment, the deformable mirror 18 includes multiple mirrors whose surfaces can be deformed to achieve wavefront control and correction of optical aberrations. The mirrors of the deformable mirror 18 are associated with mechanical actuators to move the surfaces of the secondary and tertiary mirrors 14, 16 to desired positions.

In one embodiment, the fast steering mirror 20 includes a reflective surface, and may be configured to manipulate the reflective surface to control the direction of the reflection of the beam of electromagnetic radiation produced by a laser. The fast steering mirror 20 may be configured to include a fixed base, a pivot flexure or bearing, which couples the reflective surface to the base, and several actuators each configured to move the reflective surface relative to the base. The fast steering mirror 20 may be configured to manipulate the reflective surface to control a direction of the reflection of the beam of electromagnetic radiation, including light and infrared light, off of the reflective surface, and configured to steer the reflective surface as a unit. The actuators can include voice coils or piezoelectric devices.

In one embodiment, the off-axis parabolic objective 22 is configured to collect the beam of electromagnetic radiation to create a collimated beam.

In one embodiment, the high-energy laser/short-wave infrared combiner/beam splitter 24 is configured to combine two inputs (two beams of electromagnetic radiation) into a single output (a single beam of electromagnetic radiation) and to split a single input (a single beam of electromagnetic radiation) into two outputs (two beams of electromagnetic radiation).

In one embodiment, the SWIR imager 26 is a SWIR camera provided by an appropriate commercial source. As stated above, the SWIR imager 26 can be replaced by another type of imager depending on the application.

In one embodiment, the fold mirrors 28, 30 are each flat mirrors configured to direct the beam of magnetic radiation to a desired target.

In one embodiment, the focus element 32 is a lens configured to focus the beam of electromagnetic radiation.

In one embodiment, a narrow/wide field of view group of lenses 34 are configured as a common lens group to achieve a narrow or wide field of view.

In one embodiment, the first wide field of view group of lenses 36 is a group of lenses configured to achieve the wide field of view. These lenses are switched out of the optical path to achieve the narrow field of view.

In one embodiment, the second wide field of view group of lenses 38 is a group of lenses configured to achieve a wide field of view. These lenses are switched out of the optical path to achieve the narrow field of view.

In one embodiment, the filter wheel 40 is configured to filter the image prior to entering the SWIR imager 26.

Although the fast steering mirror 20 and the combiner/beam splitter 24 in the shown embodiment are configured to direct portions of the beam of electromagnetic radiation to the SWIR imager 26 and to the first and second wide field of view groups of imagers, 36, 38, it should be understood that the telescope 10 can be configured to accommodate any number of detectors. Also, the fast steering mirror 20 and the combiner/beam splitter 24 of the telescope 10 can be configured to vary the direction of portions of the beam of electromagnetic radiation based on the positions of detectors with respect to the fast steering mirror 20 and the combiner/beam splitter 24.

Referring back to FIG. 1, the movement of the secondary mirror 14 is achieved by an actuator 50 that is configured to provide total travel and position accuracy required for focus along axis A. In one embodiment, the actuator 50 is a linear actuator capable of a travel range of 13 mm, a sensor resolution of 0.005 µm, and a minimum incremental motion of 0.1 µm. The actuator 50 further is capable of bidirectional repeatability of +/−0.5 µm, load capacity of 20 N, and configured with an incremental linear encoder. Similarly, the movement of the tertiary mirror 16 is achieved by an actuator 52 that is configured to provide total travel and position accuracy required for focus along axis B. In one embodiment, the actuator 52 is a linear actuator capable of a travel range of 50 mm, a sensor resolution of 0.060 µm, and a minimum incremental motion of 0.02 µm. The actuator 52 further is capable of bidirectional repeatability of +/−0.1 µm, load capacity of 80 N, and configured with an incremental linear encoder. It should be noted that the on-axis movement of the secondary and tertiary mirrors 14, 16 enable the telescope 10 to be focused across a larger engagement range. While moving the secondary mirror 14 alone provides good performance at the design point, the wavefront error increases as the range to target changes. The movement of both the secondary mirror 14 and the tertiary mirror 16 is synchronized to provide improved performance across target ranges of interest.

In some embodiments, the components of the telescope 10 are secured in a case or housing 60 (FIG. 1) that embodies and supports the components of the telescope 10. The telescope 10 can be configured to provide long-range surveillance, target acquisition, tracking, range finding and laser designation. The housing 60 can be formed and configured to support the primary mirror 12, the secondary mirror 14, and the tertiary mirror 16 in secure positions during operation. The actuators 50, 52 are also supported by the housing 60 to move the secondary and tertiary mirrors 14, 16. The housing 60 is also configured to support the remaining components of the telescope 10, including deformable mirror 18, the fast steering mirror 20 and the off-axis parabolic objective 22. In one embodiment, the housing 60 is fabricated from a suitable metal material, such as an aluminum alloy having the same coefficient of thermal expansion as the primary mirror 12, secondary mirror 14, and tertiary mirror 16.

In some embodiments, the telescope 10 can include a controller, to control the operation of the movable components of the telescope 10. For example, the controller can be configured to control the movement of the actuators 50, 52, which control the movement of the secondary and tertiary mirrors 14, 16, respectively, in a synchronized manner. The controller further can be configured to control the movement of the deformable mirror 18, the fast steering mirror 20, and control the operation of the SWIR imager 26.

Figure 4:
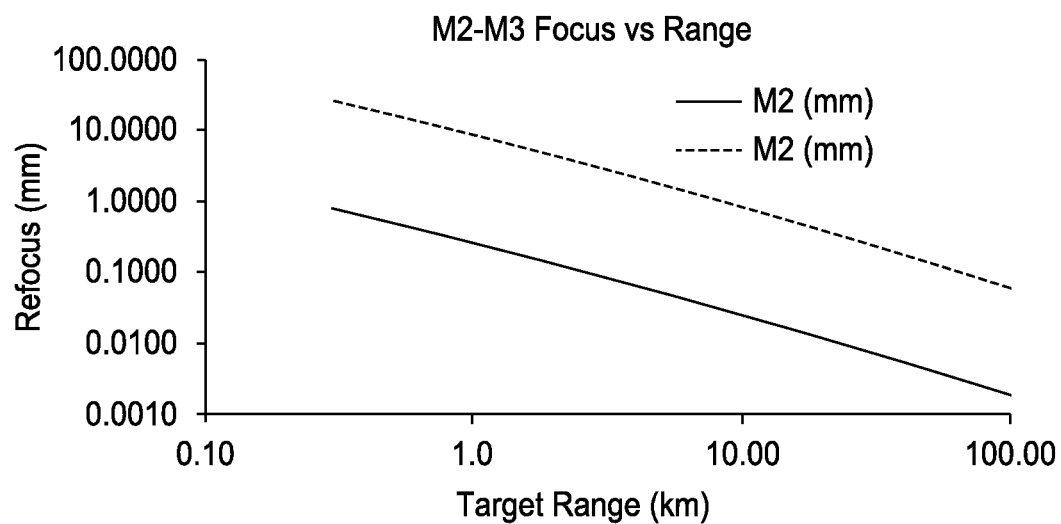
FIG. 4 is graph showing mirror motion (travel) versus range with refocus.
Figure 5:
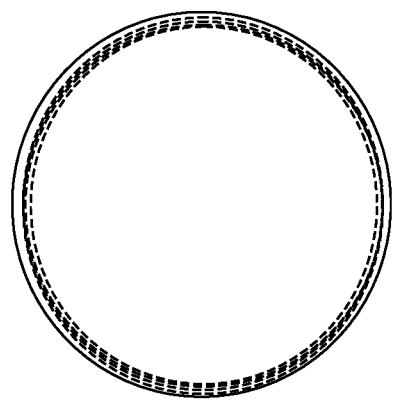
FIG. 5 is a view showing walk of a beam foot print on a primary mirror of the telescope.

FIG. 4 illustrates wavefront and beam walk versus range with refocus for best wavefront. The telescope 10 is optimized to focus at 1 km, and the secondary and tertiary mirrors 14, 16 are synchronized to be focused for each range point along an axis. The root mean square wavefront on-axis error is below 0.15 waves @1.055 um over entire 0.3 km to infinity range. Beam walk is controlled within +/−3 mrad of fast steering mirror 20 compensation, but the footprint on the primary mirror increases from a diameter of 38.56 cm at infinity to 39.92 at 0.3 km focus. The footprint on the primary mirror 12 is shown in FIG. 5.

Figure 6:
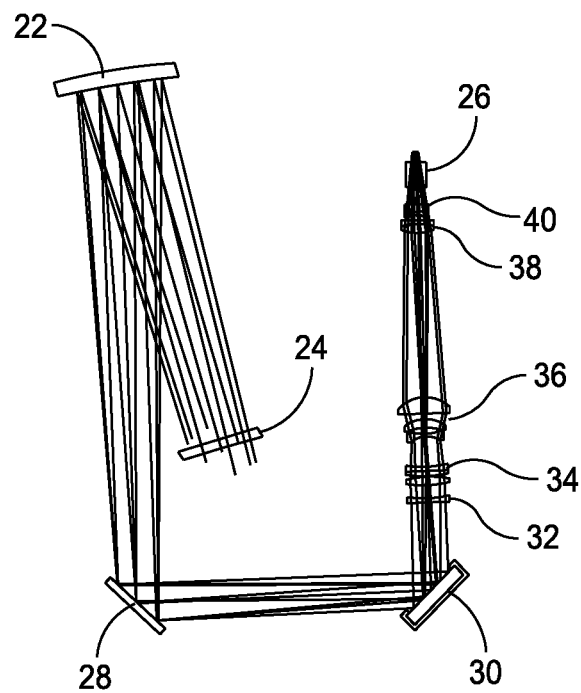
FIG. 6 is a schematic side view of the telescope showing the ray trace of the laser to a short-wave infrared imager in wide field of view.
Figure 7:
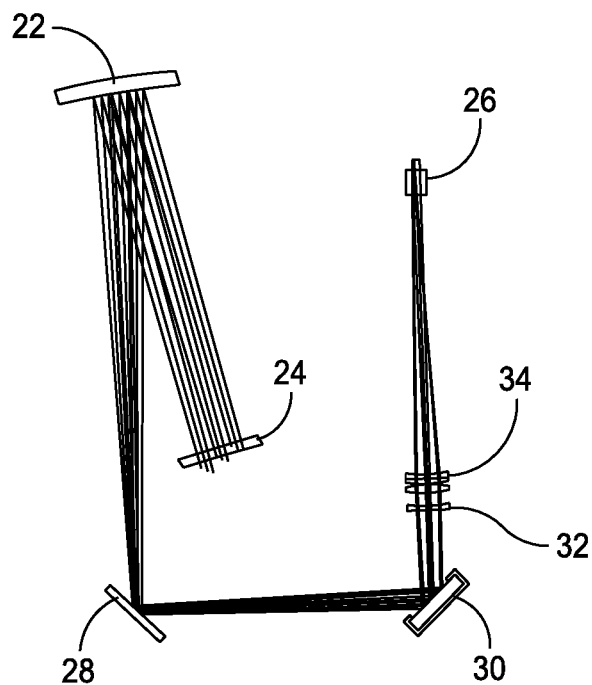
FIG. 7 is a schematic side view of the telescope showing the ray trace of the laser to the short-wave infrared imager in narrow field of view.

Referring to FIG. 6, a portion of the telescope 10 is shown, specifically, the combiner/beam splitter 24, the off-axis parabolic objective 22, the fold mirrors 28, 30, and the SWIR imager 26. In this embodiment, the telescope further includes the focus element 32, the narrow/wide field of view group of lenses 34, the first wide field of view group 36, the second wide field of view group 38 and the filter wheel 40. This configuration is particularly suited for wide field of view imaging. Referring to FIG. 7, in another embodiment, a portion of the telescope 10 is shown, specifically, the combiner/beam splitter 24, the off-axis parabolic objective 22, the fold mirrors 28, 30, and the SWIR imager 26. In this embodiment, the telescope further includes the focus element 32 and the narrow/wide field of view group of lenses 34. This configuration is particularly suited for narrow field of view imaging.

In the embodiments shown in FIGS. 6 and 7, the telescope 10 is configured with the SWIR imager 26 that is optimized over a band of 0.9-1.7 μm. In one embodiment, the telescope 10 includes a catadioptric design with a decentered parabolic mirror objective and refractive relay to reduce field curvature for performance and lens diameters to less than 2.8 inch. The telescope 10 is configured for dual zoom capabilities in wide field of view as illustrated in FIG. 6 and narrow field of view as illustrated in FIG. 7, with the narrow field of view being is static with a common focus element. As shown in FIG. 7, the first wide field of view group 36 and the second wide field of view group 38, which are shown in FIGS. 2 and 3, are removed with the narrow/wide field of view group of lenses 34 remaining to provide focus to the SWIR infrared imager 26.

Thus, it should be observed that the telescope 10 of embodiments of the present disclosure includes multiple moving mirrors to focus the laser beam while avoiding the intermediate image. The secondary and tertiary mirrors 14, 16 are moved along the optical axis to focus the high-energy laser beam at the desired range. By moving the tertiary mirror 16 in addition to the secondary mirror 14, the telescope 10 is capable of achieving excellent on-axis wavefront error across the target ranges of interest, particularly at closer ranges. Moving the secondary and tertiary mirrors 14, 16 along the optical axis allows the mirrors 14, 16 to be moved along a single axis. This design enables simple linear slide actuators 50, 52 to be used to move the mirrors 14, 16, thereby avoiding the complexity and size required for multi-axis movement.

Figure 8:
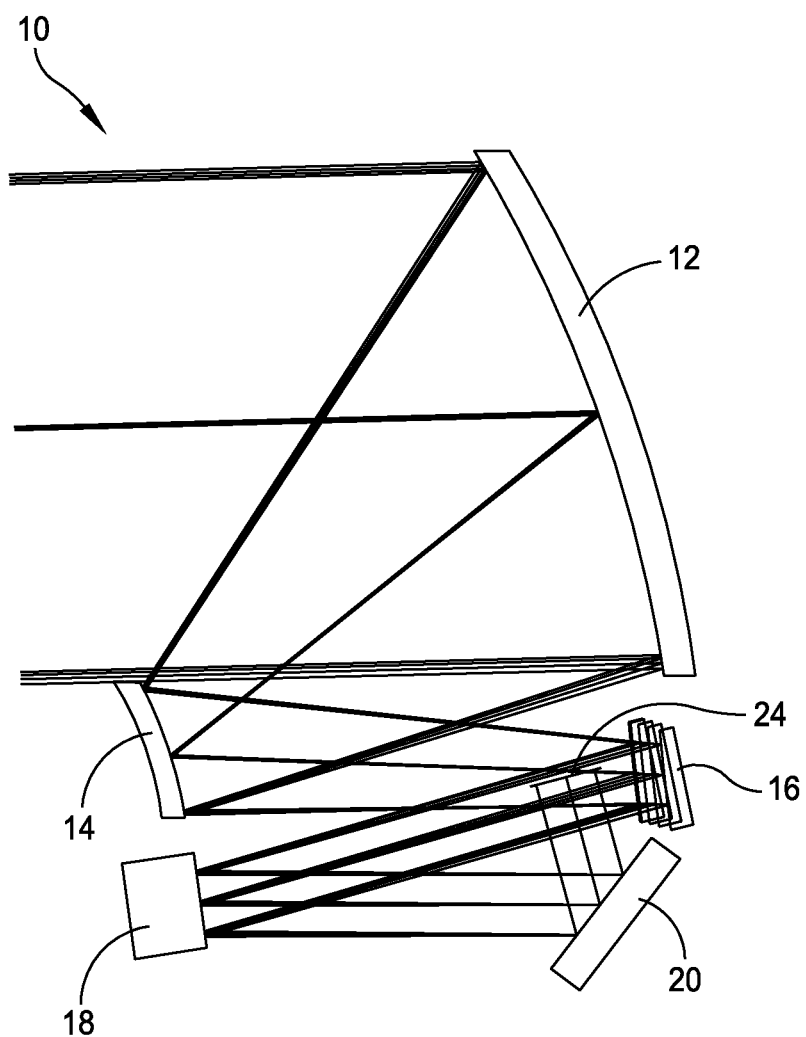
FIG. 8 is a schematic side view of the telescope showing the ray trace of the laser path.

Referring to FIG. 8, the telescope 10 is configured to reduce vignetting, which is caused by the physical dimensions of the primary, secondary and tertiary mirrors 12, 14, 16. The deformable mirror 18 can be configured to set the vignetting to the SWIR imager 26. Limited vignetting allows the deformable mirror 18 to be set to reasonable size, e.g., 3-inch diameter. Location of vignetting affects slope of a vignetting curve and controls size of imager elements.

Figure 9:
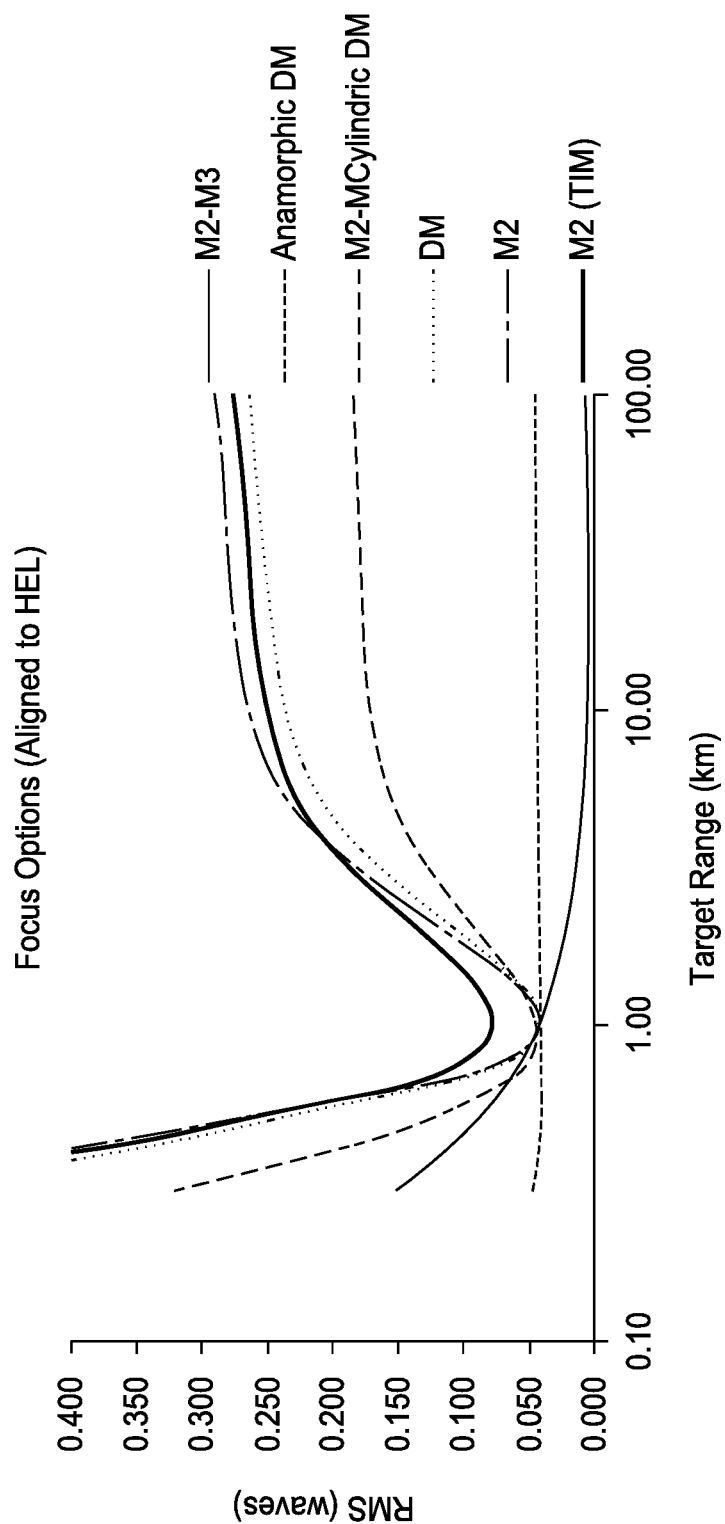
FIG. 9 is a graph showing root mean square wavefront error versus target range (km) for high energy laser focus options.

Referring to FIG. 9, the telescope 10 is designed over range but for optimum performance at a specific target distance, e.g., 1 km. As shown, the curves in FIG. 11 represent effect on high-energy laser performance using various methods of focusing. The methods providing the best performance are an anamorphic deformable mirror 18 and being able to translate or otherwise move the secondary and tertiary mirrors 14, 16 in a synchronized manner along a linear axis. Boresight and beam walk on the primary mirror 12 are managed by adjustments to the fast steering mirror 20.

It should be understood that any number of configurations can be achieved, based on the layout of the primary mirror, the secondary mirror, and the tertiary mirror, as well as the other components of the telescope.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A telescope comprising:
   a primary mirror;
   a secondary mirror configured to move along a first axis;
   a first actuator configured to move the secondary mirror along the first axis;
   a tertiary mirror configured to move along a second axis; and
   a second actuator configured to move the tertiary mirror along the second axis,
   wherein the first actuator and the second actuator to move the secondary mirror and the tertiary mirror along respective axes in a synchronized manner to focus electromagnetic radiation from the primary mirror, wherein the telescope is configured to limit root mean square wavefront on-axis error below 0.15 waves @1.055 um over entire 0.3 km to infinity range.

2. The telescope of claim 1, further comprising an anamorphic deformable mirror configured to achieve wavefront control and correction of optical aberrations.

3. The telescope of claim 2, further comprising a fast steering mirror configured to reflect electromagnetic radiation from the deformable mirror to an off-axis parabolic objective.

4. The telescope of claim 3, wherein the fast steering mirror includes a reflective surface that is configured to be manipulated to control the direction of the reflection of electromagnetic radiation.

5. The telescope of claim 3, further comprising a combiner/beam splitter disposed between the fast steering mirror and the off-axis parabolic objective.

6. The telescope of claim 5, wherein the combiner/beam splitter is configured to direct a portion of electromagnetic radiation to a short-wave infrared imager.

7. The telescope of claim 6, wherein a remaining portion of electromagnetic radiation is directed from the off-axis parabolic objective optionally to at least one fold mirror.

8. The telescope of claim 7, wherein the at least one fold mirror, if provided, is configured to direct the remaining portion of electromagnetic radiation to a group of optical elements including an optical element.

9. The telescope of claim 8, wherein the optical element includes at least one of a focus element, a narrow/wide field of view group, a first wide field of view group and a second wide field of view group.

10. The telescope of claim 9, wherein the short-wave infrared imager includes a filter wheel.

11. The telescope of claim 2, wherein the telescope is configured to reduce vignetting by manipulating the anamorphic deformable mirror.

12. The telescope of claim 1, wherein the first actuator is a linear actuator configured to move the secondary mirror a travel range of 13 mm.

13. The telescope of claim 12, wherein the second actuator is a linear actuator configured to move the tertiary mirror a travel range of 50 mm.

14. A method of directing electromagnetic radiation along an optical path of a telescope, the method comprising:

directing electromagnetic radiation to a primary mirror configured to receive and reflect electromagnetic radiation along the optical path;

directing electromagnetic radiation from the primary mirror to a secondary mirror configured to receive electromagnetic radiation from the primary mirror and to reflect electromagnetic radiation along the optical path;

directing electromagnetic radiation from the secondary mirror to a tertiary mirror configured to receive electromagnetic radiation from the secondary mirror and to reflect electromagnetic radiation along the optical path;

moving the secondary mirror along a first axis with a first actuator; and moving the tertiary mirror along a second axis with a second actuator, wherein the first actuator and the second actuator are configured to move the secondary mirror and the tertiary mirror along respective axes in a synchronized manner to focus electromagnetic radiation from the primary mirror, wherein the telescope is configured to limit root mean square wavefront on-axis error below 0.15 waves @1.055 um over entire 0.3 km to infinity range.

15. The method of claim 14, further comprising directing electromagnetic radiation from the tertiary mirror to an anamorphic deformable mirror configured to achieve wavefront control and correction of optical aberrations.

16. The method of claim 15, further comprising directing a portion of electromagnetic radiation from the deformable mirror to a short-wave infrared imager.

17. The method of claim 16, wherein directing a portion of electromagnetic radiation includes directing the portion of electromagnetic radiation to a fast steering mirror configured to reflect electromagnetic radiation from the deformable mirror to an off-axis parabolic objective.

18. The method of claim 17, further comprising positioning a combiner/beam splitter between the fast steering mirror and the off-axis parabolic objective, the combiner/beam splitter being configured to direct a portion of the beam of electromagnetic radiation to a short-wave infrared imager, with a remaining portion of the beam of electromagnetic radiation being directed from the off-axis parabolic objective optionally to at least one fold mirror.

* * * * *